United States Patent [19]
Saadeh

[11] 3,789,935
[45] Feb. 5, 1974

[54] ANGULAR ACCELEROMETER
[75] Inventor: Fuad T. Saadeh, Houston, Tex.
[73] Assignee: Texaco Inc., New York, N.Y.
[22] Filed: Oct. 19, 1971
[21] Appl. No.: 190,639

Related U.S. Application Data
[62] Division of Ser. No. 859,768, Sept. 22, 1969, Pat. No. 3,693,460.

[52] U.S. Cl............................. 175/40, 73/516 LM
[51] Int. Cl............................................. G01p 15/00
[58] Field of Search.... 175/40, 41, 26; 73/516, 488, 73/494; 166/66

[56] References Cited
UNITED STATES PATENTS
2,963,099  12/1960  Gianelloni......................... 175/26 X
3,225,830  12/1965  Livingston........................ 175/45 X
3,293,921  12/1966  Riordan........................... 73/516 LM
3,303,893  2/1967   Varney et al....................... 175/26
3,374,341  3/1968   Klotz............................. 73/151 X Primary Examiner—Marvin A. Champion
Assistant Examiner—Richard E. Favreau
Attorney, Agent, or Firm—K. E. Kavanagh et al.

[57] ABSTRACT

An angular accelerometer which employs an annular conduit filled with a dielectric fluid. The conduit is blocked at at least one point and there are piezoresponsive elements mounted so as to have the fluid directly apply pressure thereto. The elements are mounted adjacent to the blocked portion of the conduit, one on either side thereof. The structure is adapted for use with a drilling bit in order to indicate eccentricities during drilling as well as to measure instantaneous angular acceleration.

3 Claims, 5 Drawing Figures

ANGULAR ACCELEROMETER

This is a division of U.S. Pat. application Ser. No. 859,768, filed Sept. 22, 1969, now U.S. Pat. No. 3,693,460 issued Sept. 26, 1972.

BACKGROUND OF THE INVENTION

1. FIELD OF THE INVENTION

This invention concerns angular accelerometers, in general, and particularly relates to an improved accelerometer that employs an annular fluid filled conduit with piezoelectric transducers subject to fluid pressures generated thereby. In addition, the invention concerns a combination of such an angular accelerometer mounted on or adjacent to a drill bit.

2. DESCRIPTION OF THE PRIOR ART

Angular accelerometers having fluid filled circular conduits are well-known insofar as that much structure goes. However, the arrangements employed provided for various types of sensing elements that all have had limitations as to the sensitivity. Also, some of the arrangements employed electrically conductive fluids and they made use of such property of the fluid to measure fluid flow in determining accelerations. These various structures also had other drawbacks, e.g. such arrangements have had mechanically moving elements which are subject to damage under rough handling and operating conditions, or they were lacking in adequate sensitivity, or both.

SUMMARY OF THE INVENTION

Briefly, the invention concerns an angular accelerometer which comprises in combination an annular conduit filled with a dense dielectric fluid. It also comprises at least one barrier in said conduit which provides at least two ends for said conduit, and a pair of piezoelectric transducers one adjacent to each of said conduit ends. Finally, it also comprises means for mounting said transducers subject to pressure changes in said fluid.

Also, the invention may be briefly described as an angular accelerometer for measuring the eccentricity of rotation of a rotating member which has an axis of rotation. This accelerometer comprises an annular conduit having an axis and being filled with a dense dielectric fluid, and means for mounting said conduit with the axis thereof coinciding with said axis of rotation. It also comprises at least two barriers diametrically opposed in said conduit providing two ends each for said conduit, and a pair of piezoelectric transducers adjacent to each of said barriers. Finally, it comprises means for mounting said transducers subject to pressure changes in said fluid.

Once more, briefly, the invention concerns a combination with a drill bit for drilling oil wells or the like. The combination includes a collar adjacent to said bit. The combination also includes an angular accelerometer having an axis of rotation, and means for mounting said accelerometer with said axis of rotation coinciding with the longitudinal axis of said bit.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings wherein.

DESCRIPTION OF THE PREFERRED EMBODIMENTS

FIG. 1

Figure 1:
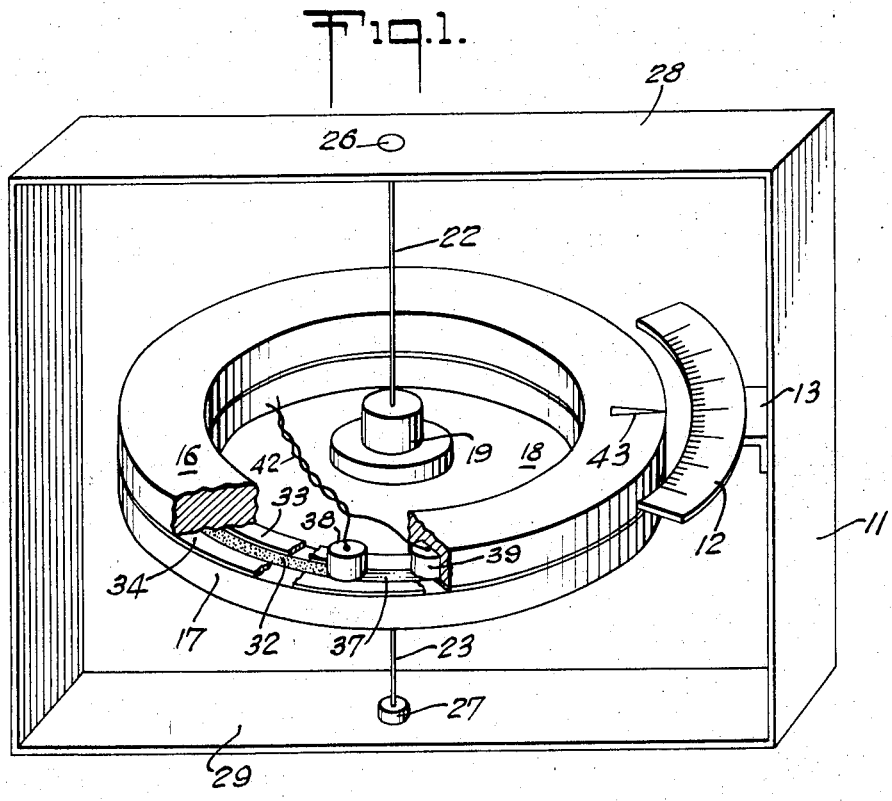
FIG. 1 is a perspective showing an accelerometer structure according to the invention.

FIG. 1 illustrates an accelerometer which was constructed for determining operating characteristics thereof. There is a supporting frame 11 having an arcuate scale 12 attached to one side by a bracket 13. The body of the accelerometer itself is constructed with upper and lower flat ring-like annular portions 16 and 17. These rings are supported on a disk 18 which in turn has a central hub 19 attached thereto.

There are vertical supporting torsion springs 22 and 23, that are attached to the hub 19 at the center or axis of it and of the disk 18. They extend vertically up and down to upper and lower hubs 26 and 27 respectively. These are mounted on the frame 11 at the center of an upper panel 28 and a lower panel 29 respectively.

The torsion springs 22 and 23 may take any feasible form. For example, they might be made up of a flat ribbon of spring metal or other resilient material which will act to provide the required torsional properties. This could, of course, be a single ribbon that passes through the hub 19. It would be fastened to the hub in any feasible manner (not shown) so as to support the body of the accelerometer.

In between the upper and lower body rings 16 and 17, there is a channel or conduit 32 that is filled with a dense dielectric fluid, e.g. oil having appropriate flow characteristics. The conduit is rectangular in cross section. It is formed by providing a pair of spacer rings 33 and 34. These spacers are situated in between the body rings 16 and 17 and extend radially a distance that is approximately one-third of the radial width thereof. The inner spacer ring 33 is flush with the inside radius of the body rings 16 and 17. Similarly, the outer ring 34 extends with its maximum radius located flush with the outside radial walls of body rings 16 and 17.

These rings 33 and 34 are mounted in fluid tight contact with the upper and lower elements 16 and 17 so as to form the channel or conduit 32 therebetween. However, it will be observed that the conduit 32 does not extend all the way around the annulus of the accelerometer. There is a barrier that is created by a solid piece 37 in the conduit 32. This is fitted into and completely fills up the conduit 32 so as to provide two ends of the conduit. There is located at each of these two ends one of a pair of transducers 38 and 39. The transducers are embedded in the ring or body member 16, with the lower (as viewed in FIG. 1) face thereof in direct contact with the fluid in the conduit 32. Consequently pressure created by the fluid in conduit 32 is directly applied to a face of each of the transducers 38 and 39 at all times.

The transducers 38 and 39 are constructed with any feasible configuration. However, they are preferably cylindrical in shape with the diameter equal to the radial width of the channel or conduit 32. In this manner the fluid pressure, caused by the fluid in conduit 32 will be applied over the entire bottom face (as viewed in FIG. 1) of both transducers 38 and 39. The upper face of the transducers are in direct contact with (and thus are constrained by) the material of the upper body ring 16. Consequently, fluid pressures from the conduit 32 will act to compress vertically the transducers 38 and 39.

These transducers 38 and 39 might be constructed of piezoresistive material and appropriate electric circuitry would be provided. It will be understood that piezoelectric tranducers generate low level $emf$'s while the use of piezoresistive elements would require either constant-current or constant-voltage exitation. However, in the illustrated structure the transducers are piezoelectric elements.

There is appropriate electrode structure for each of the transducers as is schematically indicated at the top of transducer 38 in FIG. 1. Such electrodes act to carry the signals, in the form of electrical potentials, out from the transducer elements to appropriate amplifier circuits (not shown) over appropriate insulated conductors, as indicated by the illustration of a twisted pair 42.

There is an index pointer 43 located on the upper body ring 16 of the accelerometer. This points towards the scale 12 so as to indicate rotational positions of the body of the accelerometer relative to its supporting frame 11. It will be appreciated that the accelerometer illustrated is a laboratory type of instrument and the readings which are obtained will be generally sine wave in form. Such signals will indicate the amplitude of the acceleration that takes place as the body of the accelerometer swings back and forth from its neutral position under the influence of the torsion springs 22 and 23. It has been discovered that an accelerometer according to this invention provides unexpectedly high sensitivity, in indicating acceleration forces.

FIGS. 2–4

It is to be noted that the invention is applicable to a particular use for an angular accelerometer, i.e., to indicate eccentricity of rotation. In order to provide such result, it will be appreciated that the accelerometer structure must be mounted with its physical axis coinciding with the axis of rotation of the body that is to have the eccentricity of its rotation measured.

Figure 2:
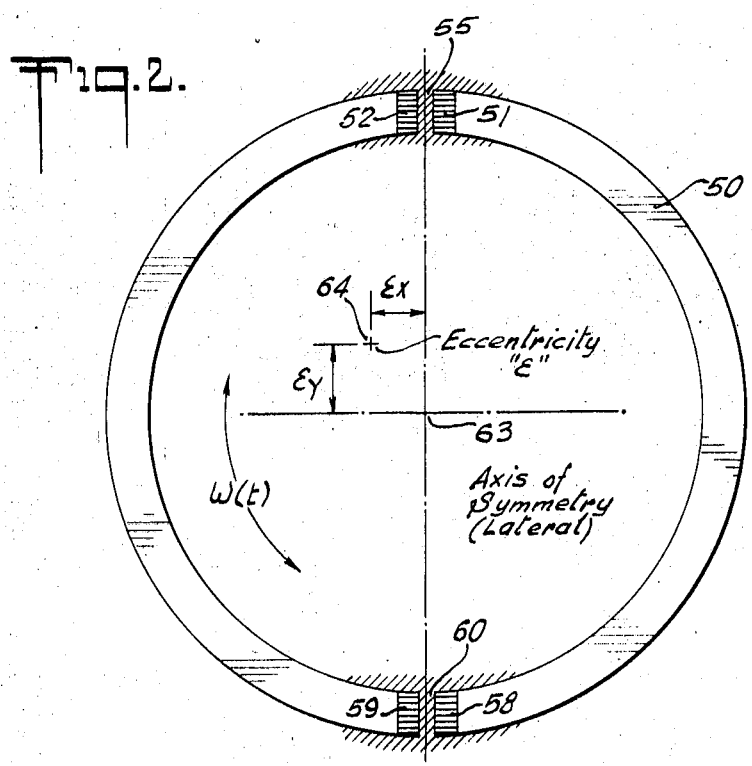
FIG. 2 is a schematic illustration indicating a modified accelerometer for use to indicate eccentricities.

Referring to FIG. 2 there is shown, schematically, an accelerometer 50 which is constructed in accordance with the same principles as the accelerometer illustrated in FIG. 1 but with an additional barrier in the fluid conduit or channel. These barriers are located diametrically opposite to one another, as indicated. Thus, there are two piezoelectric transducers 51 and 52 (schematically illustrated as rectangles with horizontal closely spaced lines) which have a barrier 55 therebetween. Diametrically opposite those two transducers and barrier, there is another pair of transducers 58 and 59, with a barrier 60 therebetween.

It will be appreciated that because of the peripherally disposed liquid masses and the symmetrical arrangement of the multiple transducers, the instrument is capable of sensing eccentric rotation. Thus, even if there is constant velocity rotation, signals will be obtained from both pairs of transducers if it is eccentric rotation. Furthermore, by having the transducer pairs located diametrically opposite one another, there is an axis of symmetry and readings may be related to components of eccentricity with respect to the geometrical center or axis. This is indicated by the captions and the symbols which show displacement of the center of rotation from a point 63 that is the geometrical axis, to a point 64 that is an instantaneous center of rotation. The latter has a displacement that is indicated by the arrow which represents eccentricity of the rotation at a given moment.

Figure 3:
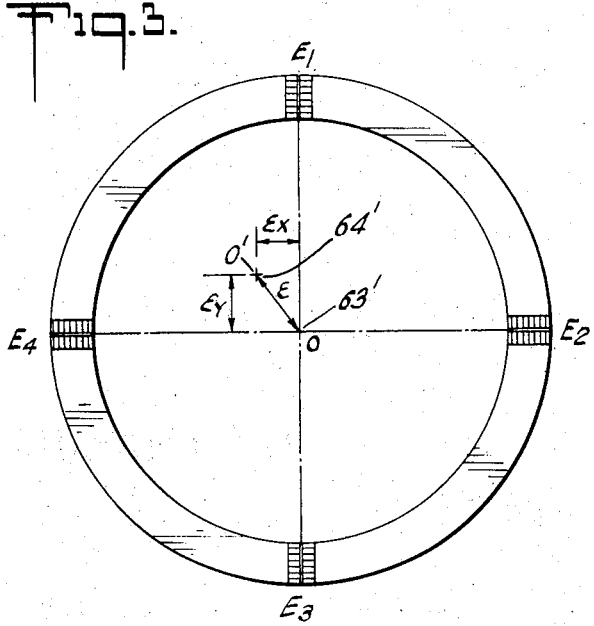
FIG. 3 is another schematic illustration like FIG. 2 but showing a modification for obtaining additional signals to provide eccentricity measurements.

FIG. 3 is a schematic showing similar to that of FIG. 2. However, it illustrates an accelerometer that is especially designed for providing eccentricity readings. It has the fluid conduit divided into four equal sections with pairs of transducers at the conduit ends that are located at diametrically opposite barriers. Such opposite barrier pairs are oriented at right angles to one another, and the barrier locations are indicated by the captions $E_1$, $E_2$, $E_3$, and $E_4$. This arrangement is substantially the same in principle as that of the FIG. 2 showing and the points which were explained above are provided with the same reference numbers but with a prime mark added to each.

It will be appreciated that the same quadrature relationship might be obtained by mounting two accelerometers like that of FIG. 2 with the geometric axes coinciding but with the fluid conduits parallel and with the barriers located at right angles.

It will be understood that in all modifications of the accelerometer there may be a restricted passage (not shown) which crosses the barrier in each case. This would be provided in order to permit slow seepage of the fluid from one side of the barrier to the other so as to provide longterm pressure equalization. The size of such passage would be such that it would not affect sensitivity or speed of response.

Figure 4:
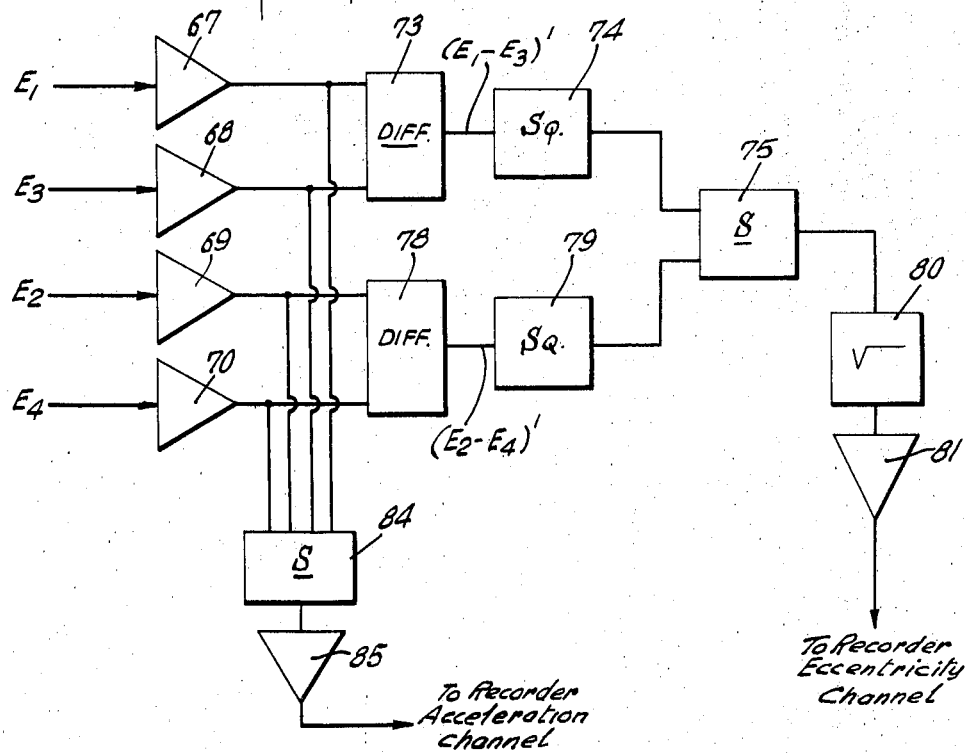
FIG. 4 is a schematic circuit diagram illustrating the way in which output signals from an accelerometer according to FIG. 3 may be treated.

In FIG. 4 there is shown a block diagram form of the electrical circuit for handling the signals from an arrangement like that illustrated in FIG. 3. Thus, there are four amplifiers 67, 68, 69 and 70. These receive the signals from the transducer pairs that are related to each of the barrier locations $E_1$, $E_3$, $E_2$, and $E_4$ respectively. In this manner, the signals from diametrically opposed pairs of transducers at barrier locations $E_1$ and $E_3$ may be subtracted in a "difference" or subtraction circuit 73. Thereafter this signal is squared by an appropriate circuit element 74, the output of which leads to a summation circuit 75.

Similarly, the signals from the transducer pair locations $E_2$ and $E_4$ (which are also diametrically opposed to one another but are oriented at right angles to the other locations) are subtracted in a circuit element 78 and squared in element 79 followed by application to another input of the summation circuit 75.

The output of the summation circuit 75 has the square root of the sum taken by a circuit element 80. The output of 80 feeds into an amplifier 81 prior to application of the signal to a recorder for recording eccentricity signals. It will be understood that the net differences between the signals of opposed pairs of elements will be proportional to the respective normal components of the eccentricity. And, consequently, the square root of the sum of the squares of signal differences will be proportional to the total instantaneous eccentricity of the center of rotation.

The arrangement according to FIGS. 3 and 4 also provides for the angular acceleration signal measurement. This may be accomplished at the same time as the eccentricity is being measured, by having the output of all the amplifiers 67–70 connected to the four inputs of a summation circuit 84. It has the output thereof connected to amplifier 85 where the signals are amplified before going to a recorder for making a permanent record of the accelerations.

FIG. 5

Figure 5:
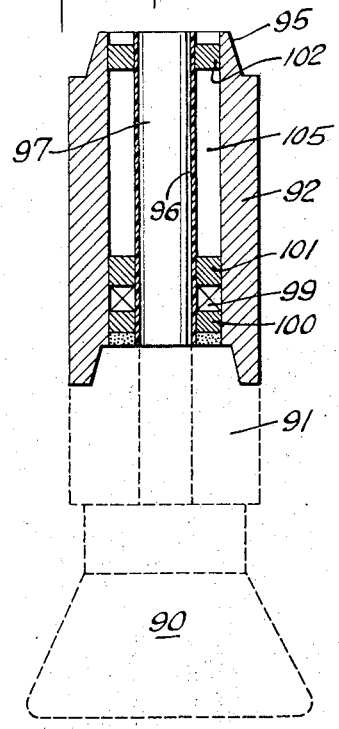
FIG. 5 is a schematic showing, in longitudinal elevation, with a portion in longitudinal cross section illustrating the combination of a bore hole drilling bit and an accelerometer all according to the invention.

FIG. 5 illustrates application of an accelerometer according to the invention to a bore hole drill bit 90, which is schematically illustrated by the dotted lines shown. The bit is carried by a collar 91 and attached thereto is a short section of pipe 92 that is threadedly attached to the collar 91 as schematically indicated. Pipe 92 also has a threaded joint 95 at the other end thereof. This is for use in attaching the unit to the lower end of a string of drill stem (not shown).

Within the section 92 there is a flexible material liner 96 that forms the walls of an internal passage 97 which connects the central passageway of the drill stem to the collar 91 and bit 90 of the drill. This permits passage of the drilling mud or other fluid that is employed during drilling operations.

Located near the lower end (as viewed in FIG. 5) of the pipe section 92 there is an accelerometer 99, that is schematically indicated in FIG. 5. This will take the form of an accelerometer according to the foregoing descriptions. Preferably, it will include the elements needed to determine both eccentricity and acceleration during the rotation of the drilling operation.

Below the accelerometer 99, as viewed in FIG. 5, there is a support ring 100. Similarly, just above the accelerometer (as viewed in FIG. 5) there is another support ring 101. These rings act to hold the accelerometer 99 in place within the pipe section 92.

Near the other end of the pipe section 92 there is another ring 102 that supports the upper end of the liner 96 and forms a seal to keep well fluids out of an annular space 105 that is located between the ring 102 and the ring 101. In this space 105 there will be located the elements (not shown) for handling the electrical signals. This includes a recorder or recorders to make a permanent record of the acceleration and eccentricity conditions. It will be observed that the structure provides for a compact and rugged yet sensitive instrument that may record the forces of acceleration and concurrently the amount of eccentricity encountered during drilling operations.

The operation of an accelerometer according to the invention, both as to angular acceleration and eccentricity measurements, may be analyzed mathematically as follows:

Piezoelectric Element Response

The magnitude and polarity of induced piezoelectric surface charges are proportional to the magnitude and direction of the applied force. The charge Q is given by $$Q = dF$$

where "$d$" is the piezoelectric constant and "$F$" is the force applied.

For an element of face area "A" and thickness "$t$" of a material with Young's modulus "Y," the force F may be expressed by the equation $$F = AY (\Delta t)/t$$

where $\Delta t$ is change in thickness.

Therefore, the charge Q becomes $Q = d (AY (\Delta t)/t)$ and since the voltage "E" resulting from the electrode charge "Q" is given by $$E = Q/C$$

where "C" is the capacitance between the electrodes and is equal to $$e\ A/t$$

where "$e$" is the dielectric constant, the emf "E" becomes $$E = Qt/eA$$

or $$E = dY (\Delta t)/e$$

Substituting for the Young's modulus "Y," the voltage becomes $$E = (dt/eA)\ F$$

and in terms of pressure where pressure $p = F/A$ $$E = (dt/e)\ p$$

Defining the ratio "$d/e$" as the voltage coefficient "$g$"

$$E = gtp \quad (1)$$

Thus, the voltage appearing across the faces of the piezoelectric element is equal to the product of the piezoelectric voltage coefficient of the element material, the thickness separating the faces, and the pressure applied.

Accelerometer Motion and Pressure

The instantaneous and local tangential acceleration "$a_t$" at the mean radius of the torus (or circular conduit) is given by $$a_t = \alpha \bar{r}$$

where "$\alpha$" is the instantaneous angular acceleration and $\bar{r}$ the mean radius from the instantaneous center to the torus.

Since the force applied by the liquid "column" in the torus against the face of the piezoelectric element is $$F = \delta V a_t = \delta V (\bar{r}\alpha)$$

where $\delta$ is the liquid density and "V" is the liquid volume, then the pressure $p$ is given by $$p = K, \bar{r}\ \alpha \quad (2)$$

K, being a constant accounting for the liquid density and dimensions of the device.

The last equation (2) above states that the instantaneous unit pressure at the face of the piezoelectric element is proportional to the product of the radius about the instantaneous center of rotation and the angular acceleration.

Pressure and Induced EMF

Equation (1) above gives the induced EMF as $E = gtp$.

For piezoelectric elements of given coefficients and thickness, the product "$gt$" may be replaced by the constant $K_2$. Then $$E = K_2 P \qquad (3)$$

Equation (2) above gives the pressure as $$p = K_1 \bar{r} \alpha$$

Combining the last two equations (2) and (3)

$$E = K_1 K_2 \bar{r} \alpha \qquad (4)$$

Equation (4) states that for given geometry and piezoelectric elements of predetermined characteristics, the induced emf signal is uniquely determined by the product of the instantaneous radius and the angular acceleration. This fact forms the basis for the operation of the subject angular accelerometer cum eccentricity detector.

While the invention has been described above in considerable detail in accordance with the applicable statutes, this is not to be taken as in any way limiting the invention but merely as being descriptive thereof.

I claim:

1. In combination with a drill bit, having a longitudinal axis and being adapted for drilling oil wells or the like,
    a collar adjacent to said bit,
    an angular accelerometer for measuring eccentricity of rotation of a rotating member having an axis of rotation,
    said accelerometer comprising
    an annular conduit having an axis and being filled with a dense dielectric fluid,
    means for mounting said conduit with the axis thereof coinciding with said axis of rotation,
    at least two barriers diametrically opposed in said conduit providing two ends each for said conduit,
    a pair of piezoelectric transducers adjacent to, but on opposite sides of each of said barriers,
    means for mounting said transducers subject to pressure changes in said fluid due to acceleration forces,
    electrical circuit means for amplifying and combining the output signals from said pairs of transducers in order to provide measurement of the eccentricity of rotation of said rotating member, and
    means for mounting said accelerator with said axis of rotation coinciding with the longitudinal axis of said bit.

2. The combination according to claim 1 wherein said mounting means is integral with said collar.

3. The combination according to claim 2 further including
    an annular chamber in said collar for housing said accelerometer and related elements, and
    passage means axially through said collar for allowing drilling fluid to flow therethrough.

* * * * *